United States Patent

Pratt et al.

Patent Number: 5,678,749
Date of Patent: Oct. 21, 1997

[54] FRICTION WELDING TOOLING

[75] Inventors: Arnold J. Pratt, Derby; John G. Searle, Cannock, both of Great Britain

[73] Assignee: Rolls-Royce plc, London, United Kingdom

[21] Appl. No.: 570,010

[22] Filed: Dec. 14, 1995

[30] Foreign Application Priority Data

Dec. 23, 1994 [GB] United Kingdom ............... 9426172

[51] Int. Cl.$^6$ .................... B23K 20/12; B23K 37/04
[52] U.S. Cl. ............... 228/2.1; 228/44.3; 228/112.1
[58] Field of Search ................... 228/2.3, 114.5, 228/2.1, 112.1; 269/44.3, 134, 136

[56] References Cited

U.S. PATENT DOCUMENTS

| | | | |
|---|---|---|---|
| 3,702,169 | 11/1972 | Bonneville et al. | 228/2.3 |
| 5,486,262 | 1/1996 | Searle | 228/112.1 |

FOREIGN PATENT DOCUMENTS 624420  11/1994  European Pat. Off. ............ 228/112.1

Primary Examiner—P. Austin Bradley
Assistant Examiner—Jeffrey T. Knapp
Attorney, Agent, or Firm—Oliff & Berridge

[57] ABSTRACT

In a friction bonding operation the friction generating and weld forming forces are usually applied perpendicular to the joint faces. Thus, whenever the joint angle changes to component cassette part of the welding machine must be reset to a new angular orientation. This situation arises in the manufacture of a compressor BLUM (Bladed drUM) for a gas turbine engine, where the blades in successive stages are set at different HADE angles. The invention provides an improved component cassette in which the HADE angle is ignored. The cassette is interlocked with the workplace holder to provide a closed force loop to contain out-of-plane forces while retaining sufficient degrees of freedom to allow the friction generating and welding movements to proceed unimpeded.

10 Claims, 2 Drawing Sheets

FRICTION WELDING TOOLING

The invention relates to friction welding tooling. In particular it concerns tooling items for holding a workpiece and a component to be welded to it.

An application of friction welding is in the manufacture of bladed disc (BLISK) and bladed drum (BLUM) assemblies for gas turbine engines where it is used to attach blades to the periphery of the basic disc. During a welding operation the disc is clamped in one item of tooling and, for example, is held firmly in a fixed position in which a location on the disc periphery is presented to a welding station. At the welding station a blade clamped in a second item of tooling is rubbed against the disc surface to generate frictional heat at the interface. When the component and workpiece reach sufficient temperature the blade is brought to a halt at a precise location and pressed against the disc to create the weld.

During the course of the operation the force exerted on the blade can reach as much as several hundred tons, the peak force probably occurs during the weld creating phase when both the blade and disc are stationary. However, the force exerted during the rubbing phase may be of the order of a hundred tons while the blade is oscillated at, say typically, 20–40 hz at an amplitude of around ±2 millimeter. Thus, the tooling and the welding machine must be capable of sustaining the extremely high loads mentioned.

The gas passage in axial rotor stages of a gas turbine engine is invariably tapered by reason of reducing or increasing the innermost diameter.

As a result of the axial pressure gradient required in compressor and turbine sections of an engine the radial depth of the gas passage is progressively reduced or increased along its axial length. Since it is normal in blisk or blum rotor stages for the circumferential surface of the disc or drum to define the inner wall of the gas passage this surface generally is formed at a cone angle to the rotational axis of the disc. The angle between a disc radius and a tangent to the tapering disc surface is called a HADE angle. The HADE angle is fixed for each stage but varies between stages according to their positions in the engine. Typically the range of HADE angles in an engine lies between 0° to 30°.

In blisk or drum manufacture the blades are attached to the disc or drum surface at the HADE angle. Consequently, during a friction welding blade attachment operation substantial forces are exerted on a disc periphery in a direction inclined to the plane of the disc. A problem which therefore arises is the adequate reaction of the forces by the welding apparatus otherwise uncontained forces can affect the secure location of the disc or the blade or both and may cause premature wear of the tooling and the welding machine. The welding forces obviously can be resolved to orthogonal components referenced to the disc plane and the welding machine and tooling designed to absorb these forces. As a result the machine and tooling is made larger and more massive giving rise to further problems due to its size and weight. The present invention is intended to overcome these drawbacks by seeking to contain and react these forces within the welding tooling so that the welding machine itself is subjected to minimum additional loading.

In accordance with the present invention there is provided friction welding tooling of the kind having workpiece clamp means for clamping a workpiece adapted to present a weld location on a periphery of the workpiece at a weld station and component clamp means for holding a component to be welded to the workpiece at said weld location, the component clamp means and the workpiece clamp means being mounted for relative movement in a plane so as to accommodate friction generating movement, wherein the workpiece clamp means and the component clamp means have interlocking portions which are slidably engaged to permit said relative planar movement and which mutually engage to transmit from one to the other forces perpendicular to said plane.

Preferably the interlocking portions comprise a flanged portion carried by one means which engages a slotted portion on the other means and wherein the flanged portion is carried by the workpiece clamp means and the slotted portion is formed in the component clamp means.

It is also preferred that the sliding bearing means is arranged to provide positive engagement of the interlocking portions whereby to transmit between them forces perpendicular to the sliding movement plane.

The invention and how it may be carried into practice will now be more particularly described with reference to a practical example of the invention illustrated in the accompanying drawings.

Figure 1:
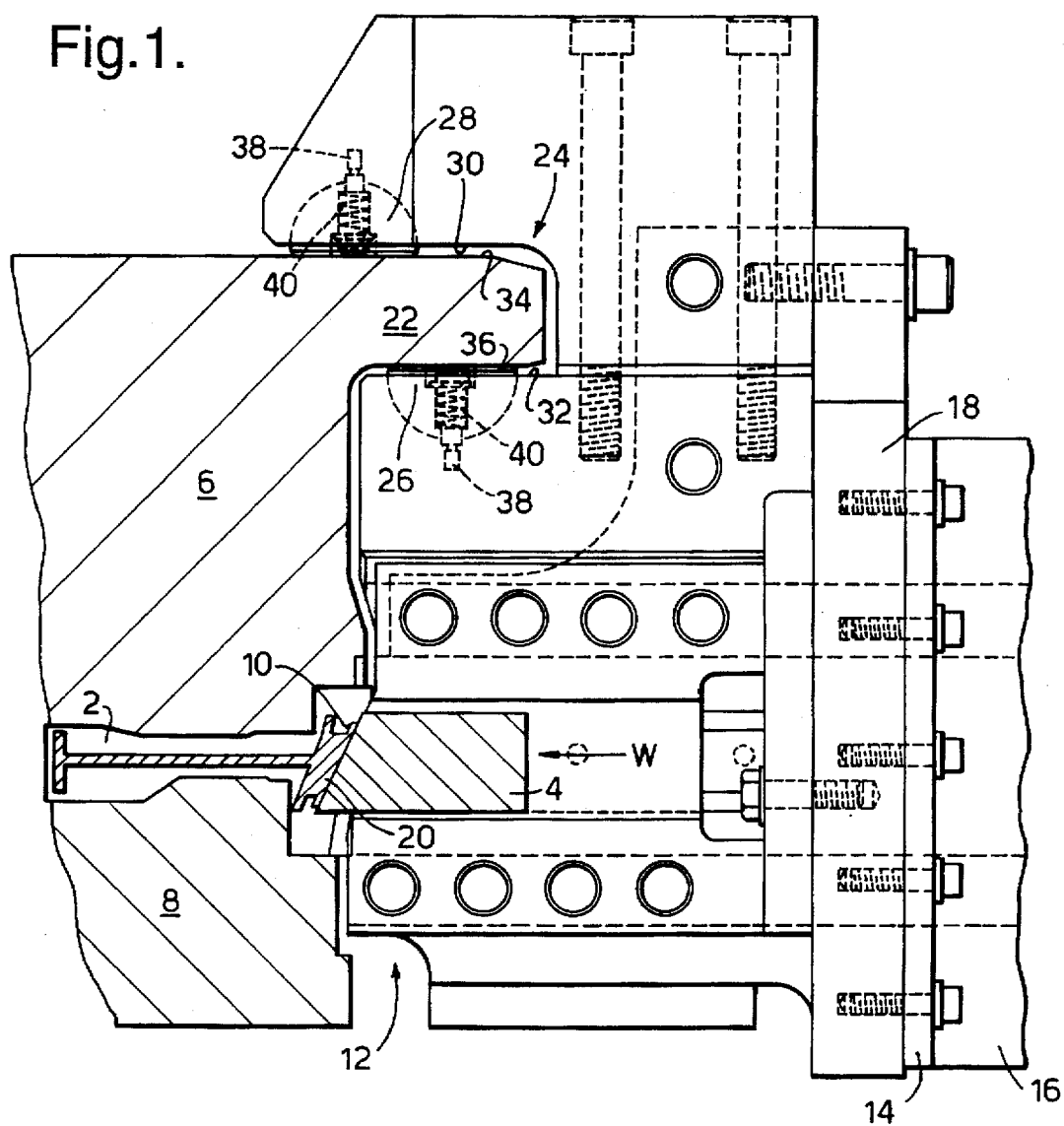
FIG. 1 shows a side view of the tooling in a vertical plane.

Referring now to the drawings: a disc is shown at 2 and a blade blank 4. The whole of disc 2 comprises an annular forging only one side of which is depicted in the drawing. The central axis of the annulus is not shown but is off the left side of the page. The disc forging is clamped between upper and lower clamp members 6,8 respectively which are basically circular in outline and firmly secured together sandwiching the disc forging 2 between them with packing or spacing rings as necessary to comprise an assembly which is symmetrical about the axis of the annulus. In the circumferential regions adjacent the periphery of disc forging 2 the clamp members 6,8 expose the rim of the disc. In accordance with the design requirement of the gas passage in the region of the rotor stage the circumferential face 10 of the disc 2 is inclined at the HADE angle with respect to a line parallel to the disc axis.

When loaded into the friction welding machine the clamping means 6,8 is disposed with the disc axis vertically and the disc, therefore, is disposed horizontally. In the orientation of the drawing the vertical runs from the top to the bottom of the page and the horizontal from left to right.

The blade holding cassette, generally indicated at 12, is carried by a flange 14 at the distal end of a ram arm 16 and is attached to the distal end 18 of an oscillator arm. The blade 16 and the oscillator are both mounted on the base structure (not shown) of the welding machine. The blade 16 is orientated to permit flexing in a direction perpendicular to the plane of the drawing to exert a weld generating force in the plane of the drawing while the oscillator arm 18 is driven in perpendicular directions, ie into and out of the drawing plane. Thus, the blade blank 14 is caused to reciprocate in path tangential to the circumference of the disc 2.

Figure 2:
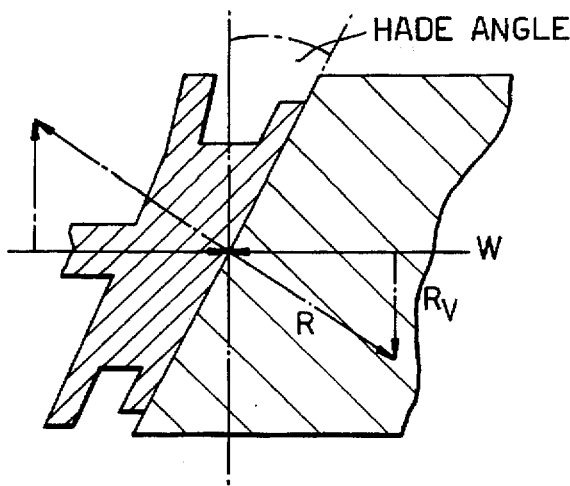
FIG. 2 is a vector force diagram illustrating the effect of an angle of inclination at the weld interface.
Figure 3:
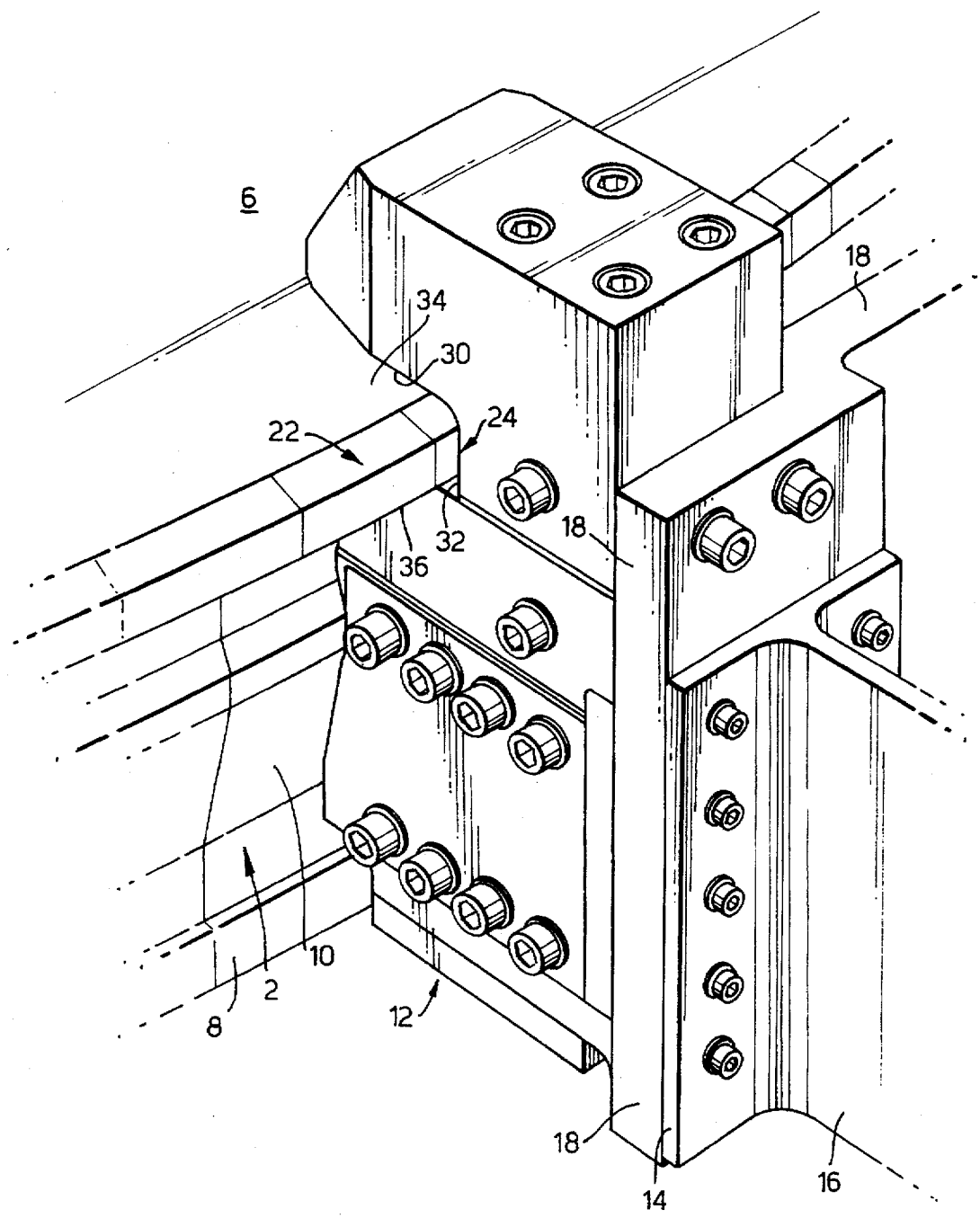
FIG. 3 is a perspective view of the tooling in an engaged position.

The blade blank 4 is basically a four-sided solid block from which the blade can be subsequently formed, and is securely held in the cassette 12 with one end face 20 exposed facing the periphery of the disc 2. This exposed end face 20 constitutes the root of the blade and is to be friction welded to the disc 2. The face 20 is therefore formed at an inclination matching the HADE angle of the disc circumferential surface 10. The cassette 12 and therefore the blade 4 is urged towards the disc in a horizontal direction with a force W. As is well known in the friction welding process the force W has a first and lower initial value during the frictional heating phase of a welding operation, during which period the oscillator (not shown) is energised to produce the tangential reciprocatory movement of the cassette. Subsequently, when sufficient frictionally generated heat has been produced to raise the temperature of the disc face 10 and blade blank face 20 to welding temperature the oscillator motion is halted and the weld pressure generating force W is applied. The applied force W is always in a direction which is radial with respect to the orientation of the disc 2. As illustrated in the Vector Force Diagram of FIG. 2 the effect of the HADE angle is to produce a reaction force R perpendicular to the surface 10 of the disc which therefore has a component Rv in the vertical direction acting on the blade 4 and cassette 12.

The welding force W may be up to several hundreds of tons. The vertical component Rv of the reaction force may reach several tens of tons and if uncontained obviously would tend to displace the blade 4 from the intended weld location. Hitherto this force has been contained by presenting a blade to the disc periphery at an angular displacement with respect to the horizontal equal to the HADE angle. It is known in the art, therefore, to mount the blade blank cassette 12 at this angle and apply the weld generating force W out of the horizontal. This in turn produces a reaction force in the disc which acts in opposition to the force clamping the disc which has to be contained. The situation is further complicated in that the HADE angle changes for different rotor stage discs, so the cassette mounting angle is unique for each type of disc.

The present invention seeks to contain these out of plane reaction forces within the weld tooling by providing a closed force loop. In the illustrated embodiment this is achieved by slidably interlocking portions carried by the disc clamp means and the blade cassette means consisting of a flange 22 which is formed as part of the upper clamp member 6 engaged in a slot 24 formed in the blade cassette 12.

The flange 22 projects outwardly from the disc clamp member 6 and is preferably, as in the embodiment, formed integrally therewith in a plane parallel to the plane of the clamped disc or workpiece 2. The flange 22 is formed as an integral annular flange projecting outwards from the clamp member around its whole circumference. Thus, the workpiece clamp members 6,8 and workpiece 2 remain firmly clamped together throughout the whole welding operation and the entire circumference of the workpiece may be presented at the welding station without unclamping the workpiece.

Bearing means 26,28 are provided in the top and bottom faces 30,32 of slot 24 in order to positively locate the reaction flange 22 with no lost motion. The bearing selected for the illustrated embodiment are half-spherical phosphor bronze bushes located in half-spherical recesses in the slot faces 30,32. Each of the bushes is secured by a single bolt and may be easily replace when wear begins to become significant. The bearing surfaces are raised slightly above the walls of the slots and positively engage the upper and lower faces 34,36 of flange 22 directly. The clamp member 6 is constructed as a steel forging and it is envisaged that no special bearing tracks are necessary although this possibility is not excluded. Some form of lubrication may also be found useful in sparing quantities.

The surfaces of bearings 26,28 and the flange faces 34,36 are all arranged parallel with each other and with the direction of the friction/weld generating force W and the direction of motion of the oscillator arm 18. The dimensions of the individual components and features, especially flange and slot widths, are chosen so the bearings surfaces maintain positive engagement with the clamp flange 22 during all phases of the welding operation. In particular, during the frictional heating phase the cassette is free is move in a tangential motion driven by the oscillator arm 18, and during the weld-generating phase the cassette is free to be urged in a radial direction by the weld-generating force W.

In accordance with the previously established convention these forces and motion all take place in the horizontal direction. However, at all times by reason of the positive engagement of the bearings 26,28 with the faces of the flange 22 vertical forces are transferred between the workpiece clamp assembly and the component holding assembly. Thus, in the illustrated example the vertical force components created as a result of the interface between the blade root face and disc periphery being inclined at the HADE angle are reacted and contained entirely within the tooling. A closed force loop is thereby created within the tooling, the force components arising due to the HADE angle are not exerted on the remainder of the welding apparatus and, therefore, the HADE angle can be ignored. Consequently, the same items of tooling and apparatus together with the same settings and adjustments are usable irrespective of the angle of inclination of the weld plane (interface) between the component and the workpiece.

The sliding bearings 26,28 shown in FIG. 1, as mentioned, comprise half-spherical phosphor bronze bushes. Each of these is located in a half-spherical recess formed into the receiving face of the slotted portion. Incidentally, the slot is formed by the face of a recess in a demountable part of the component clamp means and an opposing face of the thus exposed remainder of the clamp means body. The faces into which the bearing recesses are milled are thus exposed for convenient replacement of the bearings. The break line between these two parts is conveniently an extension of one of the slot faces.

The base of each half-spherical recess is drilled with a blind hole and tapped to receive a bearing fixing bolt 38. A clearance hole is drilled in the bearing along a corresponding diameter to receive the fixing bolt 38. In mounting the bearings a bias spring 40 is trapped under the bolt head to exert a retaining force on the bearing but allow some freedom to find its own location on its half-spherical face in the matching recess when its exposed, flat bearing surface is engaged with the interlocking flange.

As shown in the drawings the bearing means in each of the slot faces 30,32 comprises a single half-spherical bearing which, allowing for the centre hole for the fixing bolt, provides an annular bearing contact face. Providing the diameter of this contact face is great enough a single bearing bush in each slot face is considered sufficient. However, in an alternative arrangement a plurality of such bushes may be employed. It is further envisaged that other types of bearing may be employed to the same effect, but we prefer the type illustrated.

Although the invention has been described with particular reference to the welding of blades to a disc in the manufacture of a blisk for a gas turbine engine this is by no means its only application. Similarly, although the workpiece described in the particular example is circular, or annular, this is not intended to be restrictive and the workpiece edge to which a component is welded could Just as well be straight. The principles of the invention remain unaffected by such changes.

Also in the above described embodiment the assembly of workpiece and clamp means was held stationary while the component and its clamp means were oscillated in a reciprocatory movement to generate frictional heat, it is not intended that this shall imply a restriction on the scope of the invention and that, for example, the workpiece may be oscillated with respect to the component to be welded, say, in a linear (tangential) movement or in an angular movement. Neither is the described juxtaposition of interlocking flange and slot exclusive and these may be interchanged within the scope of the invention. Furthermore the bearings carried by the cassette which engage the interlocking flange may comprise other types of bearing, for example hydrostatic bearings, or bearings of the type disclosed may comprise materials other than phosphor bronze.

What is claimed is:

1. Friction welding tooling comprising:
   workpiece clamp means for clamping a workpiece so as present a weld location on a periphery of the workpiece at a weld station and component clamp means for holding a component to be welded to the workpiece at said weld location,
   the component clamp means and the workpiece clamp means being mounted for relative movement in a plane so as to accommodate friction generating movement,
   wherein the workpiece clamp means and the component clamp means have interlocking portions which are slidably engaged to permit said relative planar movement and which mutually engage to transmit from one to the other forces perpendicular to said plane.

2. Friction welding apparatus including said tooling claimed in claim 1.

3. Friction welding tooling as claimed in claim 1 wherein the interlocking portions comprise a flanged portion carried by one means which engages a slotted portion on the other means.

4. Friction welding tooling as claimed in claim 3 wherein the flanged portion is carried by the workpiece clamp means and the slotted portion is formed in the component clamp means.

5. Friction welding tooling as claimed in claim 1 comprising sliding bearing means arranged to provide positive engagement of the interlocking portions whereby to transmit between them forces perpendicular to the sliding movement plane.

6. Friction welding tooling as claimed in claim 5 wherein the sliding bearing means are provided in the faces of the slotted one of the interlocking portions to positively engage the faces of the flange one of said portions.

7. Friction welding tooling as claim 6 wherein the sliding bearing means in each face of the slotted interlocking portion comprise a plurality of individual bearings.

8. Friction welding tooling as claimed in claim 6 wherein the sliding bearing means comprises solid bearings.

9. Friction welding tooling as claimed in claim 8 wherein the solid bearings comprise half-spherical bushes.

10. Friction welding tooling as claimed in claim 8 wherein the solid bearings comprise phosphor bronze bushes.

* * * * *

UNITED STATES PATENT AND TRADEMARK OFFICE
CERTIFICATE OF CORRECTION

PATENT NO. : 5,678,749
DATED : October 21, 1997
INVENTOR(S) : Arnold J. PRATT and John G. SEARLE It is certified that error appears in the above-indentified patent and that said Letters Patent is hereby corrected as shown below:

On the title page:

In item [73], change "United Kingdom" to --Great Britain--;

In item [56] Foreign Patent Documents, add:

--2 230 991 A        11/1990        Great Britain--.

Signed and Sealed this

Twentieth Day of January, 1998

Attest:

BRUCE LEHMAN

*Attesting Officer*    *Commissioner of Patents and Trademarks*